United States Patent [19]

Ferralli

[11] Patent Number: 5,894,042

[45] Date of Patent: *Apr. 13, 1999

[54] BACTERIOSTATIC COATING OF POLYMERIC CONDUIT

[75] Inventor: Michael W. Ferralli, Fairview, Pa.

[73] Assignee: Technology Licensing Company, Pittsburgh, Pa.

[*] Notice: This patent is subject to a terminal disclaimer.

[21] Appl. No.: 08/810,123

[22] Filed: Feb. 25, 1997

Related U.S. Application Data

[63] Continuation-in-part of application No. 08/606,965, Feb. 26, 1996.

[51] Int. Cl.$^6$ .............................. F16L 9/14; F16L 9/133; B05D 1/02; B29D 22/00
[52] U.S. Cl. .................. 428/36.91; 138/145; 138/146; 424/78.09; 424/411; 424/413; 428/35.7; 428/35.8; 427/2.25; 427/230; 427/236; 427/316; 427/422; 427/476; 427/496; 427/508; 604/265
[58] Field of Search ................ 427/2.25, 385.5, 427/2.28, 2.3, 316, 236, 233, 230, 458, 475, 559, 508, 496, 558, 476, 422, 286; 604/265; 428/36.91, 35.7, 35.8; 138/145, 146; 424/411, 413, 78.09

[56] References Cited

U.S. PATENT DOCUMENTS

| | | | |
|---|---|---|---|
| 3,821,894 | 7/1974 | Roeben et al. | 73/170 A |
| 4,170,185 | 10/1979 | Murphy et al. | 114/222 |
| 4,206,514 | 6/1980 | Yamauchi | 428/195 |
| 4,286,341 | 9/1981 | Greer et al. | 427/2.25 |
| 4,533,435 | 8/1985 | Intili | 162/161 |

(List continued on next page.)

FOREIGN PATENT DOCUMENTS

| | | |
|---|---|---|
| 0 745 325 | 12/1996 | European Pat. Off. |
| 22 46 719 | 3/1973 | Germany. |
| 22 37 961 | 2/1974 | Germany. |
| WO 89 01253 | 2/1989 | WIPO. |

OTHER PUBLICATIONS

Database WPI Section Ch, Week 8745 Derwent Publications, Ltd., London, GB; Class A97, AN 87-318163 XP002035676 & JP 62 226 902 A (Idemitsu Kosan Co Ltd), Oct. 5, 1987.

Patent Abstracts of Japan vol. 096, No. 011, Nov. 29, 1996 & JP 08 193342 A (Sekisui Chem Co. Ltd).

Patent Abstracts of Japan vol. 015, No. 422 (M–1173), Oct. 25, 1991 & JP 03 176383 A (Takeuchi Press Ind Co. Ltd: Others: 01), Jul. 31, 1991.

Database WPI Section Ch, Week 8931 Derwent Publications Ltd., London, GB; Class A81, AN 89-225630 XP002035677 & JP 01 163 108 A (Kansai Denryoku KK), Jun. 27, 1989.

Database WPI Section Ch, Week 8914 Derwent Publications, Ltd., London, GB; Class A82, AN 89–104207 XP002035678 & JP 01 051 481 A (Tokyo Organic Chem Ind Co Ltd), Feb. 27, 1989.

Advertisement for DuPont MicroFree Amp Antimicrobial Powders, Dec. 19, 1996.

*Primary Examiner*—Diana Dudash
*Attorney, Agent, or Firm*—Titus & McConomy LLP

[57] ABSTRACT

A conduit coating which is made by covering a surface thereof with a polymeric material which may include an additive made of bacteriostatic, bacteriocidal, fungicidal, fungistatic or mildew-suppressing material. The coating material may be cross-linked using radiation exposure to improve the high temperature characteristics of the conduit.

44 Claims, 2 Drawing Sheets

U.S. PATENT DOCUMENTS

| | | | |
|---|---|---|---|
| 4,735,982 | 4/1988 | Ornforff, Jr. | 524/269 |
| 4,840,851 | 6/1989 | Golander et al. | 427/307 |
| 4,899,787 | 2/1990 | Ouchi et al. | 604/282 |
| 4,904,431 | 2/1990 | O'Maleki | 156/149 |
| 5,094,847 | 3/1992 | Yazaki et al. | 424/618 |
| 5,165,952 | 11/1992 | Solomon et al. | 427/2.28 |
| 5,169,884 | 12/1992 | Lindemann et al. | 524/44 |
| 5,194,265 | 3/1993 | Boettcher et al. | 424/411 |
| 5,238,749 | 8/1993 | Cueman et al. | 428/441 |
| 5,284,844 | 2/1994 | Lorenz et al. | 514/222.5 |
| 5,332,160 | 7/1994 | Ruskin | 239/542 |
| 5,366,044 | 11/1994 | Gardner et al. | 165/133 |
| 5,501,873 | 3/1996 | Ferralli | 427/195 |
| 5,503,840 | 4/1996 | Jacobson et al. | 424/421 |
| 5,505,992 | 4/1996 | Ferralli | 427/236 |
| 5,567,504 | 10/1996 | Schakel et al. | 427/389.8 |
| 5,587,407 | 12/1996 | Terry et al. | 427/385.5 |

BACTERIOSTATIC COATING OF POLYMERIC CONDUIT

CROSS-REFERENCE

This application is a continuation-in-part (CIP) of U.S. patent application Ser. No. 08/606,965, filed Feb. 26, 1996, pending and entitled "Bacteriostatic Coating of Polymeric Conduit".

FIELD OF THE INVENTION

The present invention relates to an improved polymeric conduit, and specifically to an improved polymeric conduit having a coating or overcoating made with a bacteriostatic, bacteriocidal, fungicidal, fungistatic or mildew-suppressing material.

BACKGROUND OF THE INVENTION

Typically polymeric-lined conduits such as tubes, pipes and innerducts are manufactured by extruding a thermoplastic polymer through a suitable die. These conduits are used in a diversity of applications, including as water or other fluid conduits, as protective sheaths for telecommunications cabling or other types of cable including electrical wiring, as sanitary sewer piping, and as household and industrial runoff tubing. In virtually every use, and especially in the transportation of consumable products such as potable water or medical supplies, there is a concern that bacteria, fungus or mildew may colonize the conduit interior and pose a threat to the purity of the transported species. In addition, there is a concern that such colonization may pose a threat to the integrity of the cable itself due to the production of products which may degrade the cable, or to workers who may be required to access the cable and thus become exposed to the colonizing species. Although bacteriocidal, fungicidal and mildew-resisting agents that may be generally added to polymers, and bacteriostatic polymers are available, they have not been adapted for use to line the interior or overcoat the exterior of polymeric conduit to eliminate the problems posed by such impurities to the material transported by the conduit, to the persons who handle the conduit, or to the conduit itself.

Accordingly, it is an object of this invention to provide a material and method of coating polymeric conduit with a material which exhibits bacteriostatic, bacteriocidal, fungicidal and mildew suppressing properties to reduce the potential for colonization of such species on the conduit.

It is also an object of the present invention to provide polymeric conduit having an interior and/or exterior surface with bacteriostatic, bacteriocidal, fungicidal and mildew suppressing properties to inhibit the growth of such species in the material occupying the conduit.

It is also an object of this invention to provide a coating for polymeric conduit which will release bacteriostatic, bacteriocidal, fungicidal, and mildew-suppressing agents into the material occupying the conduit.

It is also an object of this invention to provide a polymeric coating for polymeric conduit which may be compounded with materials known for their bacteriostatic, bactericidal, fungicidal and mildew suppressing properties.

It is also an object of the present invention to provide a polymeric coating for polymeric conduit which may be compounded with thermoplastic or thermoset polymeric materials and conventional commercial paint compounds cured using conventional chemical reactions.

It is also an object of the present invention to provide a polymeric coating for polymeric conduit which may be compounded with polymers which may be chemically cross-linked to each other to improve the high temperature characteristics of the conduit.

It is also an object of the present invention to provide a polymeric coating for polymeric conduit which may be compounded with polymers which may be chemically cross-linked to each other using all forms of radiation including gamma radiation, ultraviolet radiation and x-ray radiation.

It is another object of this invention to provide a method of lining an innerduct or conduit which may easily be altered to provide a lining property variability along an innerduct or conduit length. It is a further object of the present invention to combine antimicrobial materials with polymeric material for use in all applications which require or desire leaching of the antimicrobial material from the conduit surface to be minimized to below levels which will result in toxicity to humans.

SUMMARY OF THE INVENTION

Generally, the present invention provides a material and method for coating the interior surface or overcoating the exterior surface of a polymeric conduit with a material imparting bacteriostatic, bacteriocidal, fungicidal and mildew suppressing properties to the polymeric surface to which it is applied. Preferably the coating material comprises a polymer such as polyethylene, polytetrafluoroethylene, polyvinylidene fluoride, polyvinyl chloride (PVC) and/or other cross-linkable polymers, or a mixture of such materials combined with a metal such as metal-complexed ethylene-diamine-tetra-acetic acid (EDTA), cuprous oxide, cupric oxide, copper, silver or zinc or mixtures and compounds of such substance that impart bacteriostatic, bactericidal, fungicidal and mildew suppressing agents to the conduit surface. The coating material may also include a mixture of pigments, stabilizers, lubrication fillers, agents or other additives such as titanium oxide, graphite, silicon, polytetrafluoroethylene which impart coloring and/or lubrication properties. The polymeric material may be thermoplastic or optionally thermoset, and can include conventional commercial paint compounds such as alkyd-enamel or latex formulations cured using conventional chemical reactions, as well as other polymers which may be chemically cross-linked to each other to improve the high temperature characteristics of the conduit. Specifically, cross-linking of these polymers may be accomplished using all forms of radiation including gamma radiation, ultraviolet radiation and x-ray radiation.

The preferred method of applying the coating to the conduit is by hot melt spray-enhanced deposition. Other methods of applying the coating to the conduit include overcoating, co-extrusion or post-extrusion, and electrostatic or impact spray-enhanced deposition. Combination of the types of antimicrobial material disclosed herein with the types of polymeric materials disclosed herein in accordance with the process disclosed herein will cause leaching of the antimicrobial materials from the conduit surface to be minimized to below levels which will result in toxicity to humans.

In another embodiment of the invention, the effect of a mandrel can be achieved by using a spray nozzle which is juxtapositioned to the inner surface of the innerduct and by increasing the viscosity of the melt material. In this embodiment, it is possible to place a very thin coating on the inner surface which preferably varies in thickness along the longitudinal axis of the conduit. A continuous liner film of varying thickness that covers the inner surface of the conduit, or alternately a plurality of continuous or discontinuous liner strips of varying thickness can be formed by the spray nozzle. The thickness is varied by preferably varying the flow of the liner material as it is deposited from the spray nozzle. Alternately, the spray nozzle may be moved one, two or three-dimensionally with respect to the innerduct longitudinal axis while the conduit is extruded to create a liner of varying thickness along the innerduct longitudinal axis. Discontinuity can be created and varied by the placement of the nozzle openings and/or the use of a complimentary mandrel to form and configurize the coating into strips. The coating material may be placed on the interior or exterior surface of the conduit in a plurality of continuous or discontinuous strips.

Other advantages of the invention will become apparent from a perusal of the following detailed description of a presently preferred embodiment of the invention taken in connection with the accompanying drawings.

BRIEF DESCRIPTION OF DRAWINGS

FIG. (1) is a perspective view of a conduit exhibiting a coating material formed in accordance with the present invention.

FIG. (2) is a cross sectional view of the conduit formed in accordance with the present invention having a textured coating.

Figure 1:
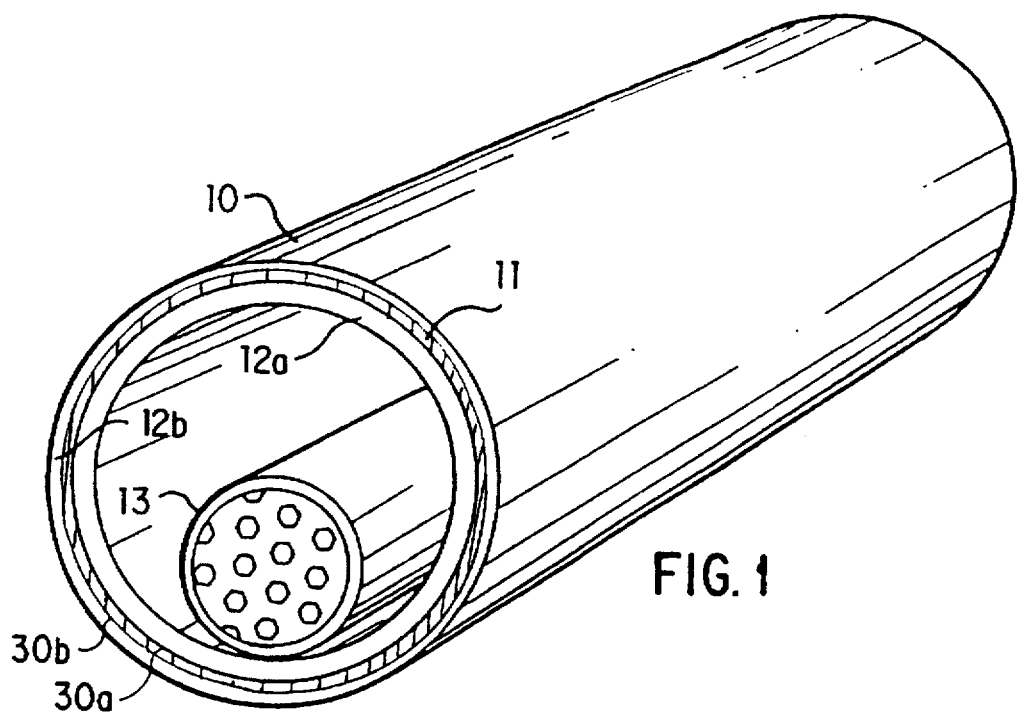
Figure 2:
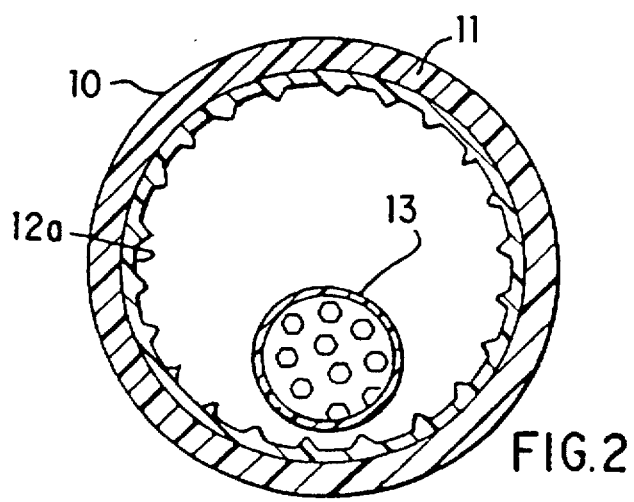
Figure 3:
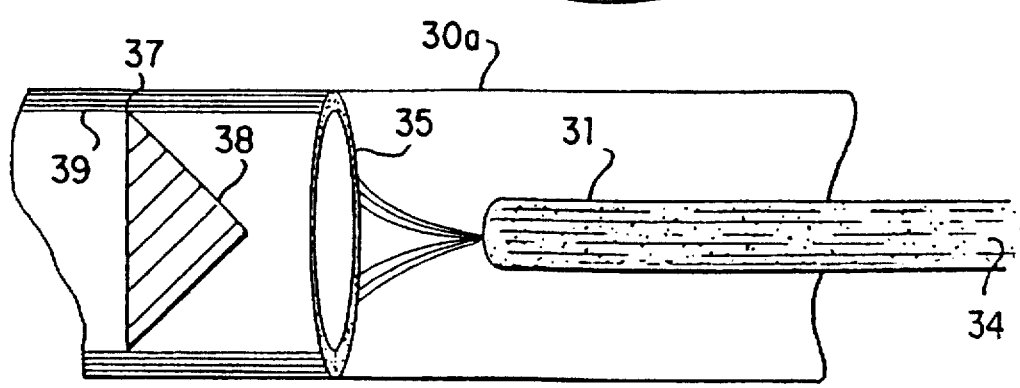
Figure 4:
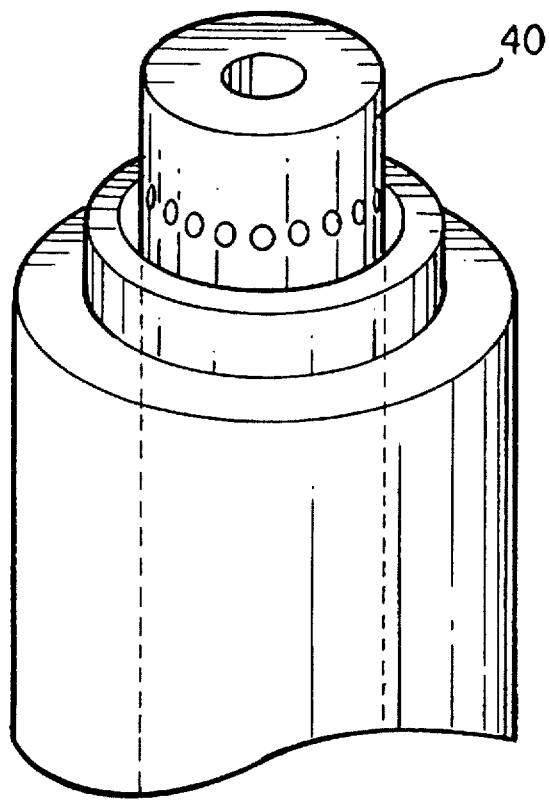
Figure 5:
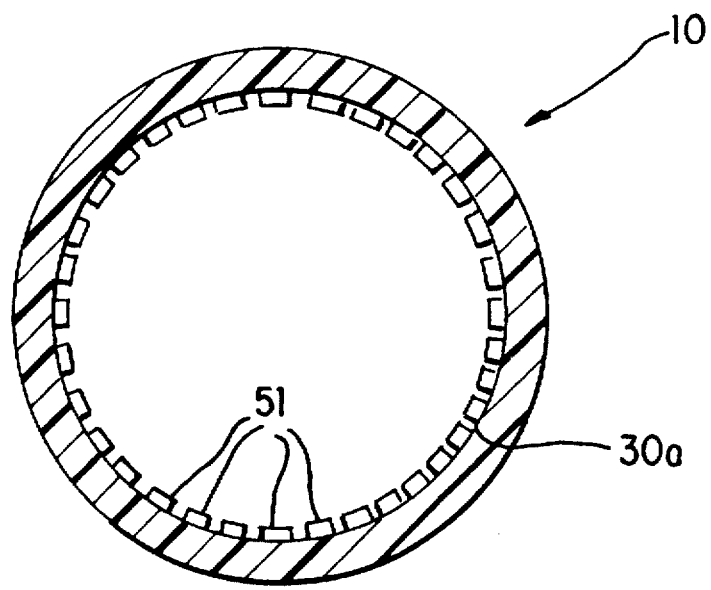

FIG. (3) is a schematic illustration of applying the coating material of the present invention using hot melt spray-enhanced deposition process.

FIG. (4) is an elevation view of the nozzle used for providing the coating material of the present invention in a plurality of ribbon-like strips.

FIG. (5) is a cross-sectional view of a conduit lined with the coating material of the present invention configured in a plurality of ribbon-like strips.

DETAILED DESCRIPTION OF THE PRESENTLY PREFERRED EMBODIMENT

FIGS. (1) and (2) illustrates conduit tubing 10 formed in accordance with the present invention that contains a pull-through fiber optic communications cable 13. Conduit 10 consists of an outer tube 11 which is preferably a thermoplastic and/or other cross-linkable polymer such as polypropylene, polyethylene or polyvinyl chloride (PVC), preferably formed by any conventional extrusion process known in the art. Outer tube 11 has a coating material 12a which is applied to the interior surface 30a of the outer tube 11. The material can alternately be applied as an overcoating 12b to the exterior surface 30b of the outer tube 11. The coating material 12a or 12b comprises a polymer such as polyethylene, polytetrafluoroethylene, polyvinylidene fluoride, polyvinyl chloride (PVC) and/or other cross-linkable polymers, or a mixture of such materials that is combined with a bacteriostatic, bacteriocidal, fungicidal and mildew suppressing material such as metal-complexed ethylenediamine-tetra-acetic acid (EDTA), cuprous oxide, cupric oxide, copper, silver, zinc or mixtures and compounds of such metals which contribute to the bacteriostatic, bacteriocidal, fungicidal and mildew suppressing properties of the coating 12a or 12b. The coating 12a or 12b may also include a mixture of pigments, stabilizers, lubrication fillers, or other agents or other additives such as titanium oxide, graphite, silicon, polytetrafluoroethylene which impart coloring and/or lubrication properties to the material. The polymeric material in coating 12a or 12b may be thermoplastic or optionally thermoset, and can include conventional commercial paint compounds such as alkyd-enamel or latex formulations cured using conventional chemical reactions, as well as other polymers which may be chemically cross-linked to each other to improve the high temperature characteristics of the conduit. Specifically, cross-linking of these polymers may be accomplished using all forms of radiation including gamma radiation, ultraviolet radiation and x-ray radiation, by exposing the coating 12a or 12b to radiation after it is deposited on the interior surface 30a or exterior surface 30b of the conduit. The radiation exposure duration and temperature of the cross-linking treatment should be consistent with conventional cross-linking techniques known in the art.

The coating 12a or 12b can be applied to interior surface 30a or exterior surface 30b of the outer tube 11 using hot melt spray-enhanced deposition as described below and in U.S. Pat. No. 5,501,873, which is incorporated herein by reference. Other methods of applying the coating 12a or 12b to the conduit 10 include overcoating, co-extrusion or post-extrusion, electrostatic spray-enhanced deposition as described in U.S. patent application Ser. No. 08/379,876 which is incorporated herein by reference, impact spray-enhanced deposition as described in U.S. Pat. No. 5,501,873 which is incorporated herein by reference, and any other similar application methods known in the art. Although FIGS. (1) and (2) illustrate a conduit 10 whose cross section is circular, it is to be understood that the conduit 10 may have any desired cross-section, such a square, rectangular, elliptical, triangular or other required shape for desired end use. Further as shown in FIG. (2), the coating 12 may be textured with undulations having inward projecting ribs with cross-sections that take any desired shape including, but not limited to, square, rectangular, circular and polygonal shapes.

FIG. (3) illustrates a preferred embodiment of the process of coating the interior surface 30a of a conduit 10 previously formed by extrusion using hot melt spray enhanced-deposition. An orificed tube or nozzle 31 containing melted or otherwise fluidized coating material 12a is preferably placed inside the conduit 10 prior to extrusion. The conduit 10 is raised to a temperature at or near its extrusion temperature. The fluidized coating material 12a is forced at temperatures at or above its melting point through the orifices of nozzle 31 by a pump (such as a piston pump—not shown) to dispense the fluidized coating material 12a in a radially symmetric pattern 35 about the interior surface 30a of the conduit 10. Pressures preferably at or above 1500 psi are used to "atomize" the coating material 12a to provide the spray coating. However, because of the polymeric nature of the preferred coating material 12a it is generally not possible to obtain an atomized spray. In this application, the spray is generally as large as short molecular fragmented polymer chains. The polymeric coating material 12a is chemically or physically fused to the interior surface 30a of the conduit 10 due to the elevated temperature of both the conduit 10 and the coating material 12a. Optionally, a heated plug 38 acts to further fuse the coating material 12a to form a film 39 on the conduit 10 surface. The heated plug 38 may optionally have a contoured edge 37 which is in contact with the film 39 to contour the film 39 with a desired texture. Combination of the types of antimicrobial materials disclosed herein with the types of polymeric materials disclosed herein in accordance with the process disclosed herein will cause leaching of the antimicrobial materials from the conduit surface to be minimized to below levels which will result in toxicity to humans.

As shown in FIGS. (4) and (5) and described in U.S. patent application Ser. No. 08/546,018, now U.S. Pat. No. 5,658,613, which is incorporated herein by reference, the coating material 12a or 12b, respectively, may be placed on the interior surface 30a (or exterior surface 30b—not shown) of the conduit 10 in a plurality of continuous or discontinuous ribbon-like strips 51 by use of a nozzle 40 juxtapositioned to interior surface 30a (or exterior surface 30b) of the conduit 10. The thickness of the liner film 39 can be made to vary along the longitudinal axis of innerduct 30 to minimize the friction encountered by the telecommunication cable as it is pulled along the longitudinal axis of the innerduct 30. Preferably, the thickness of the film 39 is varied by varying the discharge flow of the liner material 34 from the spray nozzle 31. The thickness of the film 39 will be greatest in areas where the nozzle 31 discharge flow is at its maximum value. Conversely, the thickness of the film 39 will be minimized in areas where the nozzle 31 discharge flow is at its lowest value. The range of nozzle 31 discharge flow variation or alternately the extrusion rate of the innerduct 30 can be used to control the maximum and minimum thickness of the liner film 39. A film 39 thickness pattern that varies along the longitudinal axis but not around the cross-section of the innerduct 30 can be produced when the nozzle 31 orifice lies in a plane perpendicular to the longitudinal axis of the innerduct 30. Conversely, a film 39 thickness pattern that varies along both the longitudinal axis and around the cross-section of the innerduct 30 can be produced if the nozzle 31 orifice lies in skewed relationship to the innerduct 30 longitudinal axis. A pattern of varying film 39 thickness that is periodic will be produced if the nozzle 40 flow variation is periodic. Conversely, a non-periodic variation in film 39 thickness will be produced if the nozzle 31 flow variation is not periodic.

Alternately, the thickness of the film 39 can be varied by moving the spray nozzle 31 in a in a one, two or three dimensional pattern while the innerduct 30 is extruded to cause the spray nozzle 31 to pass through the innerduct 30 interior. The thickness of the film 39 will be maximized when the film 39 is deposited in areas where the relative motion of the nozzle 31 and the innerduct 30 is in the same direction. Conversely, the thickness of the film 39 will be minimized when the film 39 is deposited in areas where the relative motion of the nozzle 31 and the innerduct 30 is in the opposite direction. The movement speed of the spray nozzle 31 or alternately the extrusion rate of the innerduct 30 may be varied to control the minimum and maximum thickness of the film 39. The movement of the spray nozzle 31 may be accomplished by any mechanical or electromechanical method known in the state of the art, such as by the use of an electrically actuated piston attached to the spray nozzle 31. The thickness of the film 39 will vary along the longitudinal axis but not around the cross-section of the innerduct 30 when the nozzle 31 movement is one dimensionally parallel to the longitudinal axis of the innerduct 30. The thickness of the film 39 will vary both along the longitudinal axis and around the cross-section of the innerduct 30 if the nozzle 31 movement is either two dimensional or three dimensional with one dimension being parallel to the innerduct 30 longitudinal axis. A pattern of varying film 39 thickness that is periodic will be produced if the movement of the nozzle 31 is periodic. Conversely, a non-periodic variation in film 39 thickness will be produced if the movement of the nozzle 31 is not periodic. Thus using either nozzle 31 flow variation or movement a textured film 39 may be formed with undulations having inward projecting ribs whose cross sections which may take on any shape including, but not limited to periodic shapes such as square, rectangular, circular, spiral and polygonal shapes.

While the invention has been described in connection with what is presently considered to be the preferred embodiment, it is to be understood the invention is not to be limited to the disclosed embodiments, but on the contrary is intended to cover various modifications and equivalent arrangements include within the spirit of the scope of the appended claims.

What is claimed is:

1. A method of coating a surface of a conduit, comprising the steps of:
   A. preparing a coating material comprising a polymeric material in combination with at least one material having antimicrobial properties;
   B. heating said coating material to a temperature above its melting point;
   C. heating said conduit to a temperature less than the lowest melting point of said coating material and said conduit; and
   D. depositing said coating material on a surface of said heated conduit to provide a coating thereover when said surface cools,
   wherein said coating material is deposited on said conduit surface by a nozzle juxtaposed to said surface.

2. A method of coating a surface of a conduit, comprising the steps of:
   A. forming a coating material comprising a polymeric material in combination with at least one material having antimicrobial properties;
   B. depositing said coating material on a surface of said conduit to provide a coating thereover;
   wherein said antimicrobial material comprises at least one substance selected from the group consisting of metal-complexed ethylene-diamine-tetra-acetic acid (EDTA), cuprous oxide, cupric oxide, copper and zinc and mixtures or compounds including at least one said substance; and
   wherein said coating material is deposited on said conduit surface by a nozzle juxtaposed to said surface.

3. A method as set forth in claim 1 or 2, wherein said coating substance is deposited by spraying.

4. A method as set forth in claim 1 or 2, wherein said coating substance is deposited in a plurality of strips.

5. A method as set forth in claim 4, wherein said strips are juxtapositioned along a surface of said conduit.

6. A method as set forth in claim 4, wherein said conduit has a continuous interior surface and wherein said strips are of a length substantially the same as the length of said conduit.

7. A method as set forth in claim 4, wherein said strips are substantially coextensive with said interior surface.

8. A method as set forth in claim 1 or 2, wherein said polymeric material is a thermoplastic polymer.

9. A method as set forth in claim 1 or 2, wherein said polymeric material is a thermoset polymer.

10. A method as set forth in claim 9, wherein said thermoset polymer is contained in a paint applied to said conduit surface.

11. A method as set forth in claim 1 or 2, wherein said conduit is comprised of a thermoplastic polymer formed by extrusion.

12. A method as set forth in claim 11, wherein said coating material is deposited onto said conduit by coextrusion.

13. A method as set forth in claim 11, wherein said coating material is deposited onto said conduit by post-extrusion.

14. A method as set forth in claim 1 or 2, wherein said coating substance is deposited onto said conduit by hot melt spray deposition.

15. A method as set forth in claim 1 or 2, wherein said coating substance is deposited onto said conduit by electrostatic spray deposition.

16. A method as set forth in claim 1 or 2, wherein said coating substance is deposited onto said conduit by impact spray deposition.

17. A method as set forth in claim 1 or 2, wherein said polymeric material comprises a polymer selected from the group consisting of polyethylene, polytetrafluoroethylene, and polyvinylidene fluoride and mixtures of said polymers.

18. A method as set forth in claim 1, wherein said antimicrobial material comprises at least one substance selected from the group consisting of metal-complexed ethylene-diamine-tetra-acetic acid (EDTA), cuprous oxide, cupric oxide, copper, silver, and zinc and mixtures or compounds including said antimicrobial materials.

19. A method as set forth in claim 1 or 2, wherein said coating material is additionally comprised of a material selected from the group consisting of graphite, talc and silicone.

20. A method as set forth in claim 17, including the steps of mixing at least one of said polymers with materials selected from the group consisting of graphite and silicone oils.

21. A method as set forth in claim 1 or 2, wherein said coating material is imparted with textured surface by means of a heated plug spaced apart from said nozzle.

22. A method as set forth in claim 1 or 2, wherein said coating material is nonuniformly sprayed onto a surface of said conduit to provide said conduit with a coating having non-uniform thickness.

23. A method as set forth in claim 1 or 2, wherein said surface is selected from the group consisting of the interior surface and the exterior surface of said conduit.

24. A conduit having a coated surface formed by the method of claim 1.

25. A conduit having a coated surface formed by the method of claim 2.

26. A conduit as set forth in claim 24 or 25, wherein said polymeric material comprises a polymer selected from the group consisting of polyethylene, polytetrafluoroethylene, and polyvinylidene fluoride and mixtures of said polymers.

27. A conduit as set forth in claim 24, wherein said antimicrobial material comprises a metal selected from the group consisting of metal-complexed ethylene-diamine-tetra-acetic acid (EDTA), cuprous oxide, cupric oxide, copper, silver, and zinc and mixtures or compounds including said metals.

28. A conduit as set forth in claim 24 or 25, wherein said surface is selected from the group consisting of the interior surface and the exterior surface of said conduit.

29. A method as set forth in claim 1 or 2, wherein said coating material is comprised of polymers which are chemically cross-linked to each other.

30. A method as set forth in claim 29, wherein cross-linking is accomplished by exposing said coating material to radiation after said coating material is deposited on said conduit.

31. A method as set forth in claim 30, wherein said radiation is selected from the group consisting of gamma radiation, ultraviolet radiation and x-ray radiation.

32. A conduit as set forth in claim 24 or 25, wherein said coating substance is comprised of polymers which are chemically cross-linked to each other.

33. A conduit as set forth in claim 32, wherein said cross-linking is accomplished by exposing said coating substance to radiation after said coating substance is deposited on said conduit.

34. A conduit as set forth in claim 33, wherein said radiation is selected from the group consisting of gamma radiation, ultraviolet radiation and x-ray radiation.

35. A method as set forth in claim 1 or 2, wherein the thickness of said coating is varied by moving said nozzle.

36. A method as set forth in claim 1 or 2, wherein the thickness of said coating is varied by adjusting the flow of said material through said nozzle.

37. A method as set forth in claim 35, wherein said movement selected from one of oscillatory, non-oscillatory or random.

38. A method as set forth in claim 36, wherein said adjustment is selected from one of oscillatory, non-oscillatory or random.

39. A conduit as set forth in claim 24 or 25, wherein the thickness of said coating is varied by a method selected from the group consisting of moving said nozzle or adjusting the flow of said material through said nozzle.

40. A conduit as set forth in claim 24 or 25, wherein said movement selected from one of oscillatory, non-oscillatory or random.

41. A conduit as set forth in claim 39, wherein said adjustment is selected from one of oscillatory, non-oscillatory or random.

42. A method as set forth in claim 1 or 2, wherein the amount of said antimicrobial material remains below a level at which leaching of said antimicrobial material from said conduit surface into a fluid contained therein will result in toxicity to humans.

43. A conduit as set forth in claim 24 or 25, wherein the amount of said antimicrobial material remains below a level at which leaching of said antimicrobial material from said conduit surface into a fluid contained therein will result in toxicity to humans.

44. A method of coating a surface of a conduit, comprising the steps of:
   A. preparing a coating material comprising a polymeric material in combination with at least one material having antimicrobial properties;
   B. heating said coating material to a temperature above its melting point;
   C. heating said conduit to a temperature less than the lowest melting point of said coating material and said conduit; and
   D. then depositing said coating material on a surface of said heated conduit to provide a coating thereover when said surface cools.

* * * * *